H. T. HANSEN.
TRANSMISSION GEAR FOR MOTOR VEHICLES.
APPLICATION FILED DEC. 26, 1907.
904,868.
Patented Nov. 24, 1908.
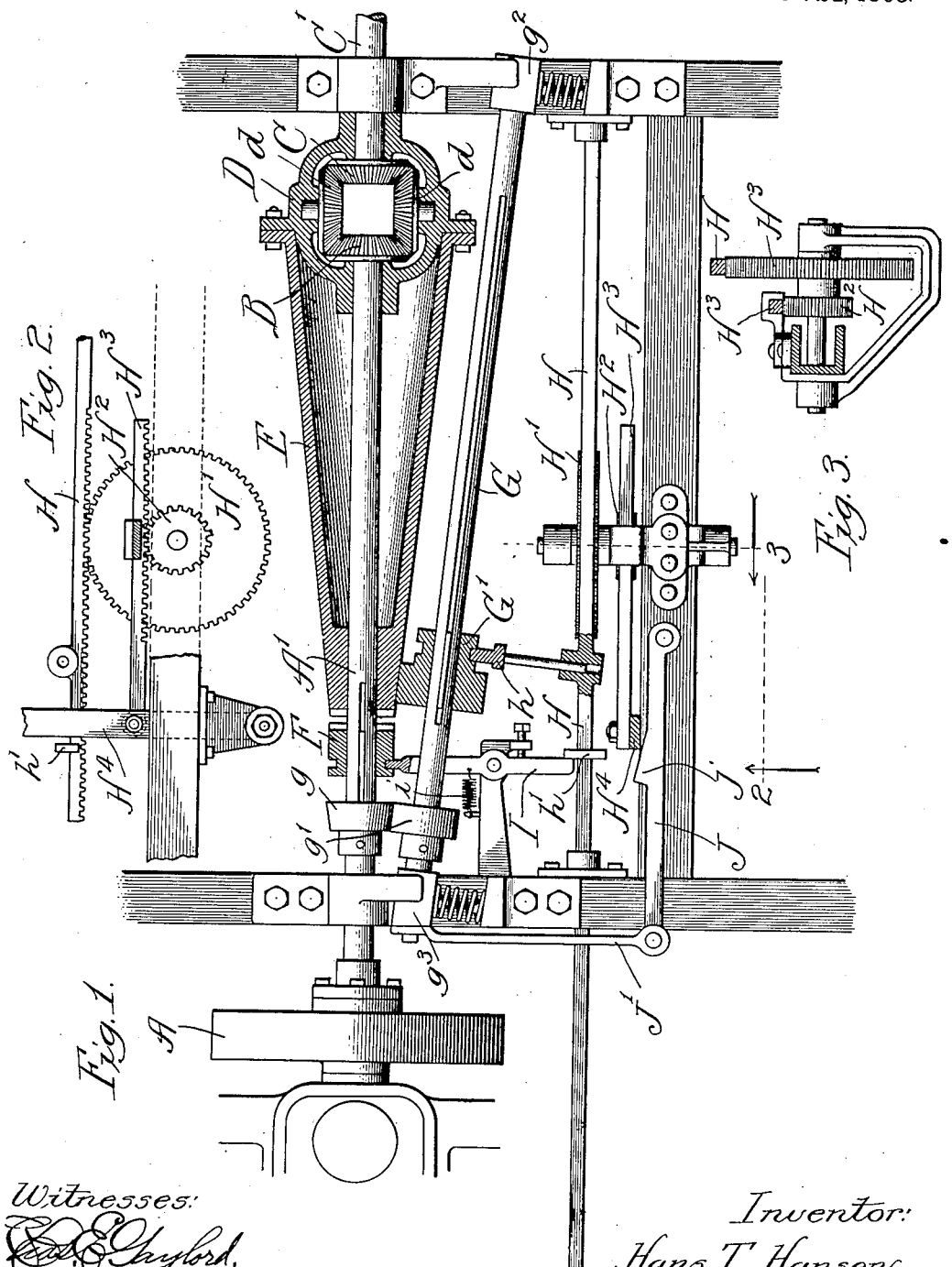

UNITED STATES PATENT OFFICE.

HANS T. HANSEN, OF CHICAGO, ILLINOIS.

TRANSMISSION-GEAR FOR MOTOR-VEHICLES.

No. 904,868.  Specification of Letters Patent.  Patented Nov. 24, 1908.

Application filed December 26, 1907. Serial No. 408,047.

*To all whom it may concern:*

Be it known that I, HANS T. HANSEN, a citizen of the United States, residing at 100 Washington street, Chicago, in the county of Cook and State of Ilinois, have invented a new and useful Improvement in Transmission-Gear for Motor-Vehicles, of which the following is a specification.

My invention relates to certain new and useful improvements in transmission gear for motor vehicles, and is fully described and explained in the specification and shown in the accompanying drawings, in which:

Figure 1 is a view of the transmission partly a plan view and partly in horizontal sections; Fig. 2 is a section in the line 2 of Fig. 1 showing a shifting arrangement; and Fig. 3 is a section in the line 3 of Fig. 1.

Referring to the drawings A indicates the fly-wheel of a motor, which following a common automobile practice will be an internal combustion engine of the compression type. Secured to this fly-wheel and rotatable therewith is a shaft $A^1$ extending rearwardly and having fast on its rear end a pinion B which is one of the side-pinions of an ordinary differential gear. Opposed to the pinion B is a similar pinion C which is the opposite side-pinion of the differential gear, the same being rigidly secured on a shaft $C^1$ which is suitably connected up to the driving-wheels of the vehicle. D indicates the casing of the differential gear, and this casing serves as a support for the intermediate pinions of the differential gear which are indicated in the drawing by $d$. Loose upon the shaft $A^1$ is a friction-cone E rigidly secured to the casing D of the differential. A clutch-collar F is mounted on the shaft $A^1$ so as to be capable of longitudinal movement only, the clutch-collar being adapted to lock the friction-cone E against rotation on the shaft when desired. It will be evident that when the clutch-collar F is thrown into engagement with the friction-cone E so that the cone and shaft rotate together the transmission will drive direct, the cone, shaft, pinion B and differential casing all revolving positively together at the same speed. Obviously whenever the pinion B and the casing D are rotated at the same speed the pinion C and shaft $C^1$ will be positively driven in the same direction and at the same speed with the shaft $A^1$.
A counter-shaft G is mounted parallel to the adjacent surface of the friction-cone E, and keyed to the said counter-shaft is a friction-pinion $G^1$ longitudinally movable but non-rotatable upon the shaft. The pinion $G^1$ is of the same diameter as the small end of the cone E. The shaft G is rotated at the same speed with the shaft $A^1$ by means of two mutually-engaging pinions $g$, $g^1$, these pinions being preferably of the friction type as illustrated. The shaft G is mounted in spring-pressed journals $g^2$, $g^3$, by which continuous engagement is at all times maintained between the pinion $g$, $g^1$ and the pinion $G^1$ and the surface of the friction-cone E. There is, however, provided means by which, when the car is running on direct drive the journal $g^3$ can be shifted backward to release the gear $g^1$ from its engagement with the gear $g$ and to release the pinion $G^1$ from engagement with the friction-cone, in order that unnecessary rotation of these parts may be avoided.

Before proceeding to a detailed account of the means by which the various adjustments hereafter to be explained are effected, the operation of the gear when not running direct will be set forth. The manner of running with a direct drive has already been set forth. When the parts are in the position shown in Fig. 1, however, with the clutch F disengaged from the friction-cone E the car will still be driven at the equivalent speed of a direct drive but by friction. In this arrangement the shaft G rotates at the same speed with the shaft $A^1$ but in an opposite direction and the pinion $G^1$ being of the same size as the small end of the friction-cone E, drives the said cone at the same speed with the shaft $A^1$ and in the same direction. The obvious result is therefore that the gear-ratio is exactly the same as when the clutch engages the friction-cone, that is the pinion B and the gear-case D rotate at the same speed and in the same direction and consequently the shaft C rotates at the same speed with the shaft $A^1$. If now the friction-pinion $G^1$ be shifted to the right as viewed in Fig. 1, the speed of the cone E will be gradually decreased with the result that the speed of the shaft $C^1$ will be gradually decreased. When the pinion $G^1$ reaches a point on the cone of twice the diameter of said pinion then the cone and casing D will rotate at half the speed of the shaft $A^1$ and the shaft $C^1$ will obviously stand still. A further movement of the pinion to the right with consequent further slowing of the speed of the cone and casing D will produce backward rotation of the shaft $C^1$ at gradually increasing speed, obviously with the arrangement here shown the shaft $C^1$ can never be made to rotate backwards as fast as it will forwards for backward rotation at equal speed with the shaft $A^1$ could only be secured by holding the cone and casing D perfectly stationary. However, in self-propelled vehicles the reverse speeds are all necessarily very slow and the arrangement here shown will produce backward speed sufficiently high for all practical purposes.

It will thus be seen that if the pinion $G^1$ be set at a point on the cone of double the diameter of the pinion, the engine can be started by cranking in the usual way, while the vehicle is stationary. By drawing the pinion to the left, that is forward toward the engine, the machine will gradually accelerate its speed until, when the pinion reaches the point shown in Fig. 1, the machine will be moving full speed forward with the shaft $C^1$ turning at the same speed as the engine. At this time the clutch can be thrown in making a positive drive, and by mechanism now to be described the counter-shaft can be thrown out of engagement with the main shaft so as to reduce the number of moving parts.

The shifting of the pinion $G^1$ is accomplished by means of a fork $h$ having a pin running in a perforation in a rack-bar H, which bar can be moved backwards and forwards by the rotation of a pinion $H^1$. Fast to the pinion $H^1$ is a smaller pinion $H^2$ in mesh with a rack-bar $H^3$ which can be reciprocated by a hand-lever $H^4$. Thus by drawing the hand-lever $H^4$, the rack-bar H will be moved backward at a considerable speed to shift the pinion $G^1$ to reduce the speed of the shaft $C^1$ as aforesaid and by drawing the same forward the rack-bar H can be moved forward to increase the speed of the shaft $C^1$. The rack-bar H is provided with a shoulder $h^1$ adapted to engage one end of a lever I of the first order, the opposite end of said lever being forked to engage the clutch-collar F. The lever I is normally held in such position as to hold the clutch-collar F disengaged from the friction cone E by means of the spring $i$. By this arrangement an extreme forward movement of the hand-lever will automatically force the clutch F into engagement with the friction-cone E to produce a positive direct drive. Simultaneously with this action the hand-lever $H^4$ will engage a cam $j$ on a lever J, which lever has its free end pivoted to an extension $J^1$ on the journal $g^3$ at the forward or left-hand end of the counter-shaft G. Thus at the moment when the clutch-collar is engaged with the friction-cone to produce a direct drive, the journal $g^3$ will be retracted so as to disengage the pinion $g^1$ from the pinion $g$, thus stopping the rotation of the counter-shaft G. Thus when the vehicle is driven direct there are no idle parts to be driven. The entire system carried by the shafts $A^1$ and $C^1$ will rotate as one solid piece and no other parts will move at all. The moment it is desired to reduce the speed of a vehicle the hand-lever $H^4$ is drawn backward disengaging the clutch-collar F from the friction-cone E and producing the necessary engagement of pinions $g$ and $g^1$ so that the car is driven by friction and continued movement will reduce the gear-ratio gradually to a point where the shaft $D^1$ will stand still.

I am aware that it has heretofore been proposed to construct transmission devices in which two of the three members of a differential or planetary gearing were positively driven at different speeds, the power being taken off the third member. It is of course evident that the differential gear herein shown is simply a special form of planetary gear in which the gear-ratio between the two side or extreme members is one to one instead of some different ratio such as exists where the ordinary form of planetary gear comprising internal spark-gear and external spark-gear having an intermediate pinion is used. If any other form of planetary gear be substituted for the differential gear herein shown the operation will be substantially the same excepting that the point where the driven shaft is stationary will not be the point where the intermediate member of the planetary is moved at half the speed of the driving member but will be some other point depending upon the gear-ratio used. In devices of the general type wherein different speeds are positively imparted to two of the members of a planetary gear, two forms of construction are common. In the first of these one of the extreme-members of the differential is driven at a constant speed, the other extreme-member is driven at a variable speed and the power is taken off of the intermediate member. Obviously with this form of construction the intermediate member can never reach the speed of the positively driven member, and as a result to drive the car at a speed equivalent to a direct drive, it becomes necessary to gear up the parts and the extreme gear which has a variable speed must be run with extreme velocity in any event. It has also been proposed to drive both the extreme members of a planetary gear at variable speeds but this arrangement is open to the same disadvantages above pointed out. It is impossible to bring the intermediate member from which power is taken up to the speed of the fastest driven pinion and as a result some, or many parts of the mechanism must run at a speed much greater than the speed of the engine at some time.

It has also been proposed to take power off one extreme member of a planetary gear to drive the intermediate member at a constant speed and to vary the speed of the other side or extreme members. This construction produces results analogous to mine, in that the side-member from which power is taken can be brought up to the speed of the positively driven member and when brought up to that speed a clutch can be thrown in to make a direct drive. The friction mechanism used to produce the variable speed being simultaneously thrown out. With a device of this character, however, the only way in which it is possible to bring the extreme member from which power is taken up to the speed of the intermediate member which is positively driven is to drive the member of variable speed at a very much greater speed than the speed of the positively driven member which is connected to the engine. As a result where the intermediate member of the planetary gear is positively driven, direct drive can only be produced by rapid rotation of the parts and when the car is standing still the velocity of the variable speed-member instead of being less than that of the engine is much greater. The running of gears at high speed necessarily produces noise and wear which are undesirable and it is obviously expedient to reduce the speed of the gears as much as possible. This is accomplished in the form of construction herein shown by positively driving one extreme member of the planetary or differential gear, taking power from the other extreme member and driving the intermediate member at a variable speed. Thus when the car is driven direct, the intermediate member and positively driven member both rotate at the speed of the engine and as the car is slowed down the intermediate member, which has a variable speed moves slower and slower, instead of faster and faster as in the case just described. As a result, the desired object is accomplished with the least possible movement of the gears and consequently with less wear, noise and trouble than in the forms discussed.

I realize that considerable variation is possible in the details of construction of my improved device, without departing from the spirit of my invention, and I do not intend therefore, to limit myself to the specific form herein shown and described.

What I claim as new, and desire to secure by Letters Patent, is—

1. The combination with a planetary-gear, of means for taking power from one extreme pinion thereof, means to drive the other extreme pinion at a speed not exceeding the speed of the prime mover and for driving the intermediate pinion-carrying member at a variable speed, and means for positively preventing relative rotation between the extreme pinion to which power is applied and the intermediate pinion-carrying member when moving at substantially equal speeds.

2. The combination with a planetary-gear, of means for taking power from one extreme pinion thereof, means to drive the other extreme pinion at a speed not exceeding the speed of the prime mover and for driving the intermediate pinion-carrying member at a variable speed, decreasing from a speed equal to the maximum speed of the extreme pinion to which power is applied, and means for positively preventing relative rotation between the extreme pinion to which power is applied and the intermediate pinion-carrying member when moving at substantially equal speeds.

3. The combination with a planetary-gear, of means for taking power from one extreme pinion thereof, means to drive the other extreme pinion at the speed of the prime mover and for driving the intermediate pinion-carrying member at variable speeds, and means for positively preventing relative rotation between the two driven members when moving at substantially equal speeds.

4. The combination with a planetary-gear, of means for taking power from one extreme member thereof, means to drive the other extreme member at the speed of the prime mover and to drive the intermediate pinion-carrying member at a variable speed decreasing from the speed of the extreme pinion to which power is applied, and means for positively preventing relative rotation between the two driven members when moving at substantially equal speeds.

5. The combination with a planetary-gear, of means for taking power from one extreme pinion thereof, and for driving the other extreme pinion at a speed not exceeding the speed of the prime mover and for driving the intermediate pinion-carrying member at a variable speed, and means for positively preventing relative rotation between two members of the planetary gear when moving at equal speeds.

6. The combination with a planetary-gear, of means for taking power from one extreme pinion thereof, means for driving the other extreme pinion at a speed not exceeding the speed of the prime mover and for driving the intermediate pinion-carrying member at a variable speed decreasing from a speed equal to the maximum of the extreme pinion to which power is applied, and means for positively preventing relative rotation between two members of the planetary-gear when moving at substantially equal speeds.

7. The combination with a planetary-gear, of means for taking power from one extreme-pinion thereof, means for driving the other extreme pinion at substantially the speed of the prime mover and for driving the intermediate pinion-carrying member at a variable speed, and means for positively preventing relative rotation between two members of the planetary-gear when moving at equal speeds.

8. The combination with a planetary-gear, of means for taking power from one extreme pinion thereof, means for driving the other extreme pinion at the speed of the prime mover and for driving the intermediate pinion-carrying member at a variable speed, which decreases from the speed of the extreme pinion to which power is applied, and means for positively preventing relative rotation between two members of the planetary-gear when moving at equal speeds.

9. The combination with a planetary-gear, of means for taking power from one extreme pinion thereof, means for driving the other extreme pinion at a speed not exceeding the speed of the prime-mover and for driving the intermediate pinion-carrying member at a variable speed and means for positively preventing relative rotation between the extreme pinion to which power is applied and the intermediate pinion-carrying member when moving at substantially equal speeds, and means for disconnecting the driving means from the intermediate pinion-carrying member simultaneously therewith.

10. The combination with a planetary-gear, of means for taking power from one extreme pinion thereof, means for driving the other extreme pinion at a speed not exceeding the speed of the prime-mover, and for driving the intermediate pinion-carrying member at a variable speed decreasing from a speed equal to the maximum speed of the extreme pinion to which power is applied, and means for positively preventing relative movement between the extreme pinion to which power is applied and the intermediate pinion-carrying member, and means for simultaneously disconnecting the driving means from the intermediate pinion-carrying member.

11. The combination with a planetary-gear, of means for taking power from one extreme pinion thereof, means for driving the other extreme pinion at the speed of the prime-mover and for driving the intermediate pinion-carrying member at variable speeds, means for positively preventing relative movement between the two driven members of the planetary-gear when moving at substantially equal speeds, and means for simultaneously disconnecting the driving means from the intermediate pinion-carrying member.

12. The combination with a planetary-gear and means for taking power from one extreme pinion thereof, of means for driving the other extreme pinion at the speed of the prime-mover and for driving the intermediate pinion-carrying member at variable speeds decreasing from the speed of the extreme pinion to which power is applied, means for positively preventing relative rotation between the two driven members when moving at substantially equal speeds, and means for simultaneously disconnecting the driving means from the intermediate pinion-carrying member.

13. The combination with a planetary-gear, of means for taking power from an extreme pinion thereof, means for driving the other extreme pinion at a speed not exceeding the speed of the prime-mover and for driving the intermediate pinion-carrying member at a variable speed and devices for simultaneously preventing relative movement between two members of the planetary-gear when moving at equal speeds and for disconnecting the driving means from the intermediate pinion-carrying member.

14. The combination with a planetary-gear, of means for taking power from one extreme pinion thereof, of means for driving the other extreme pinion at a speed not exceeding the speed of the prime-mover and for driving the intermediate pinion-carrying member at a variable speed decreasing from a speed equal to the maximum of the speed of the extreme pinion to which power is applied, means for positively preventing relative rotation between two members of the planetary-gear when moving at substantially equal speeds and means for simultaneously disconnecting the driving means from the intermediate pinion-carrying member.

15. The combination with a planetary-gear, of means for taking power from an extreme pinion thereof, of means for driving the other extreme pinion positively at the speed of the prime-mover and for driving the intermediate pinion-carrying member at a variable speed, means for positively preventing relative rotation between two members of the planetary-gear when moving at equal speeds and for simultaneously disconnecting the driving means from the intermediate pinion-carrying member.

16. The combination with a planetary-gear, of means for taking power from one extreme pinion thereof, means for driving the other extreme pinion at the speed of the prime-mover and for driving the intermediate pinion-carrying member at a variable speed decreasing from the speed of the extreme pinion to which power is applied, means for positively preventing relative rotation between two members of the planetary-gear when moving at equal speeds, and for simultaneously disconnecting the driving means from the intermediate pinion-carrying member.

17. The combination with a driving and a driven shaft and a planetary-gear having its two extreme pinions respectively secured to said shafts, of a friction cone loose on the driving shaft and secured to the intermediate pinion-carrying member of the planetary-gear, a countershaft adapted to be driven by the driving shaft, a friction pinion movable on the countershaft and adapted to engage the friction cone, and means for positively engaging said cone with the driving-shaft to secure a positive drive.

18. The combination with a driving and a driven shaft and a planetary-gear having its two extreme pinions respectively secured to said shafts, of a friction cone loose on the driving shaft and secured to the intermediate pinion-carrying member of the planetary-gear, a countershaft adapted to be driven by the driving shaft, a friction pinion movable on the driving shaft and adapted to engage the friction cone, means for positively engaging said cone with the driving-shaft to secure a positive drive, and means for simultaneously disconnecting the countershaft from the driving-shaft.

HANS T. HANSEN.

In presence of—
R. SCHAEFER,
L. KIRKLAND.